United States Patent
Accad et al.

(10) Patent No.: US 12,010,514 B2
(45) Date of Patent: Jun. 11, 2024

(54) METHODS AND SYSTEMS TO AUTHENTICATE A USER ACCOUNT USING AN INTERNET PROTOCOL (IP) ADDRESS

(71) Applicant: T-Mobile Innovations LLC, Overland Park, KS (US)

(72) Inventors: Ahmad Al Accad, Renton, WA (US); Pablo Medeiros Dominguez, Redmond, WA (US); James Latham, Redmond, WA (US); David W. Vaden, Everett, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 281 days.

(21) Appl. No.: 17/695,682

(22) Filed: Mar. 15, 2022

(65) Prior Publication Data
US 2023/0300611 A1 Sep. 21, 2023

(51) Int. Cl.
*H04L 29/06* (2006.01)
*H04W 12/06* (2021.01)
*H04W 12/08* (2021.01)
*H04W 12/72* (2021.01)
*H04W 8/20* (2009.01)

(52) U.S. Cl.
CPC .......... *H04W 12/06* (2013.01); *H04W 12/08* (2013.01); *H04W 12/72* (2021.01); *H04W 8/20* (2013.01)

(58) Field of Classification Search
CPC ..... H04W 12/06; H04W 12/08; H04W 12/72; H04W 8/20
See application file for complete search history.

(56) References Cited

U.S. PATENT DOCUMENTS

| 9,084,071 | B2 * | 7/2015 | Lisboa | H04W 60/00 |
| 10,212,163 | B1 * | 2/2019 | Loganadane | H04W 12/06 |
| 2011/0302643 | A1 * | 12/2011 | Pichna | H04W 12/08 726/7 |
| 2013/0031615 | A1 * | 1/2013 | Woodward | H04W 8/02 726/4 |
| 2013/0125205 | A1 * | 5/2013 | Hsu | H04W 88/06 726/3 |

OTHER PUBLICATIONS

Ala-Laurila, Juha, Jouni Mikkonen, and Jyri Rinnemaa. "Wireless LAN access network architecture for mobile operators." IEEE Communications Magazine 39.11 (2001): 82-89. (Year: 2001).*

* cited by examiner

*Primary Examiner* — Ka Shan Choy

(57) ABSTRACT

A method comprises extracting, by an authentication application of an identity and access management system, an Internet Protocol address of a carrier hotspot device from a data packet received from an access device, wherein the access device is connected to the carrier network using the carrier hotspot device, wherein the Internet Protocol address is assigned to the carrier hotspot device when the carrier hotspot device attaches to the carrier network, transmitting, by the authentication application to an identification application in a core network of the carrier network, the Internet Protocol address of the carrier hotspot device, and receiving, by the authentication application from the identification application, an identifier of the carrier hotspot device associated with the Internet Protocol address.

20 Claims, 8 Drawing Sheets

METHODS AND SYSTEMS TO AUTHENTICATE A USER ACCOUNT USING AN INTERNET PROTOCOL (IP) ADDRESS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Identity and Access Management (IAM) refers to the processes, technologies, and policies for managing digital identities and controlling how those identities can be used to access resources. In the case of a telecommunications carrier, the digital identities being managed include users or subscribers that are registered with the carrier, and the resources being managed include resources in a carrier network. Typically, a user may register with a carrier by purchasing one or more voice and/or data plans with one or more corresponding devices, such as a mobile phone or a tablet. The user may then create a user account with the carrier using a signup or registration process by communicating with an IAM system. During the registration process, the user may provide a password, a Mobile Subscriber Integrated Services Digital Network (MSISDN) number (i.e., phone number), and other authentication factors (e.g. email one-time password, short message service (SMS) one-time password, biometrics, security questions, etc.). For example, the one-time password may be used to prove that a user is in possession of device having the MSISDN. An IAM system may send a one-time password to a mobile phone via SMS, and the user may enter the password into the carrier website or application to prove the user has possession of the device having the MSISDN.

In some cases, the SMS one-time password may also be used to prove the user has possession of the device when the user logs into the account at the carrier website or application. Users may log in to their account using a variety of methods including different types of information, such as, for example, usernames, passwords, SMS one-time passwords, security questions, etc. A user may stay logged in on a particular device using cookies. Different use cases may require different levels of security. In addition, users may recover the account for password recovery a combination of other available authentication methods including SMS one-time password.

However, the use of an SMS one-time password has a number of security flaws. One such problem involves bad actors calling victims, often claiming to be from customer care, and requesting the victim to read them a SMS one-time password. The bad actor may then use the one-time password to fraudulently log into the victim's account. In addition, some devices are not capable of receiving SMS messages for SMS one-time password authentication, and are not capable of providing information to answer security questions. These devices may include, for example, mobile tablets, wearable devices, mobile WiFi hotspots, carrier home WiFi hubs, and Internet of Thing (IoT) devices (e.g. connected cars).

SUMMARY

In an embodiment, a method for authorizing access to a user account by an access device communicatively coupled to a carrier hotspot device attached to a carrier network is disclosed. The method comprises receiving, by an authentication application of an identity and access management system from the access device, credentials for creating or logging in to the user account associated with a user, wherein the access device is connected to the carrier network using the carrier hotspot device, extracting, by the authentication application, an Internet Protocol address of the carrier hotspot device from a data packet received from the access device, wherein the Internet Protocol address is assigned to the carrier hotspot device when the carrier hotspot device attaches to the carrier network, transmitting, by the authentication application to an identification application in a core network of the carrier network, the Internet Protocol address of the carrier hotspot device, requesting the identification application to provide an identifier of a device registered with the carrier network that has been allocated the Internet Protocol address, receiving, by the authentication application from the identification application, the identifier of the carrier hotspot device associated with the Internet Protocol address, and providing, by the authentication application to the access device, an indication that the access device is permitted to create the user account or granted access to the user account.

In another embodiment, a method for authorizing access to a user account by a carrier hotspot device attached to a carrier network is disclosed. The method comprises receiving, by an authentication application of an identity and access management system, from a carrier hotspot device connected to the carrier network, a request to create or log in to the user account, wherein the request includes an Internet Protocol address of the carrier hotspot device, wherein the Internet Protocol address is assigned to the carrier hotspot device when the carrier hotspot device attaches to the carrier network, extracting, by the authentication application, the Internet Protocol address of the carrier hotspot device from the request, transmitting, by the authentication application to an identification application in a core network of the carrier network, the Internet Protocol address of the carrier hotspot device, requesting the identification application to provide an identifier of a device registered with the carrier network that has been allocated the Internet Protocol address, receiving, by the authentication application from the identification application, the identifier of the carrier hotspot device associated with the Internet Protocol address, and providing, by the authentication application to the carrier hotspot device, an indication that the carrier hotspot is permitted to create the user account or granted access to the user account.

In yet another embodiment, a system is disclosed. The system comprises at least one processor, at least one non-transitory memory, an authentication application, and an identification application in a core network of the carrier network. The authentication application is stored in the at least one non-transitory memory. When the authentication application is executed by the at least one processor, the authentication application causes the at least one processor to be configured to obtain an Internet Protocol address of a carrier hotspot device, wherein an access device is connected to a carrier network using the carrier hotspot device, wherein the Internet Protocol address is assigned to the carrier hotspot device when the carrier hotspot device attaches to the carrier network. The identification application is also stored in the at least one non-transitory memory. When the identification application is executed by the at least one processor, the identification application causes the at least one processor to be configured to receive, from the authentication application, the Internet Protocol address of the carrier hotspot device, determine an identifier of the carrier hotspot device associated with Internet Protocol address based on address-to-identifier mappings accessible to the identification application, and transmit the identifier to the authentication application. The authentication application further causes the at least one processor to be configured to provide, to the access device, an indication that the access device is permitted to create a user account or granted access to the user account.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
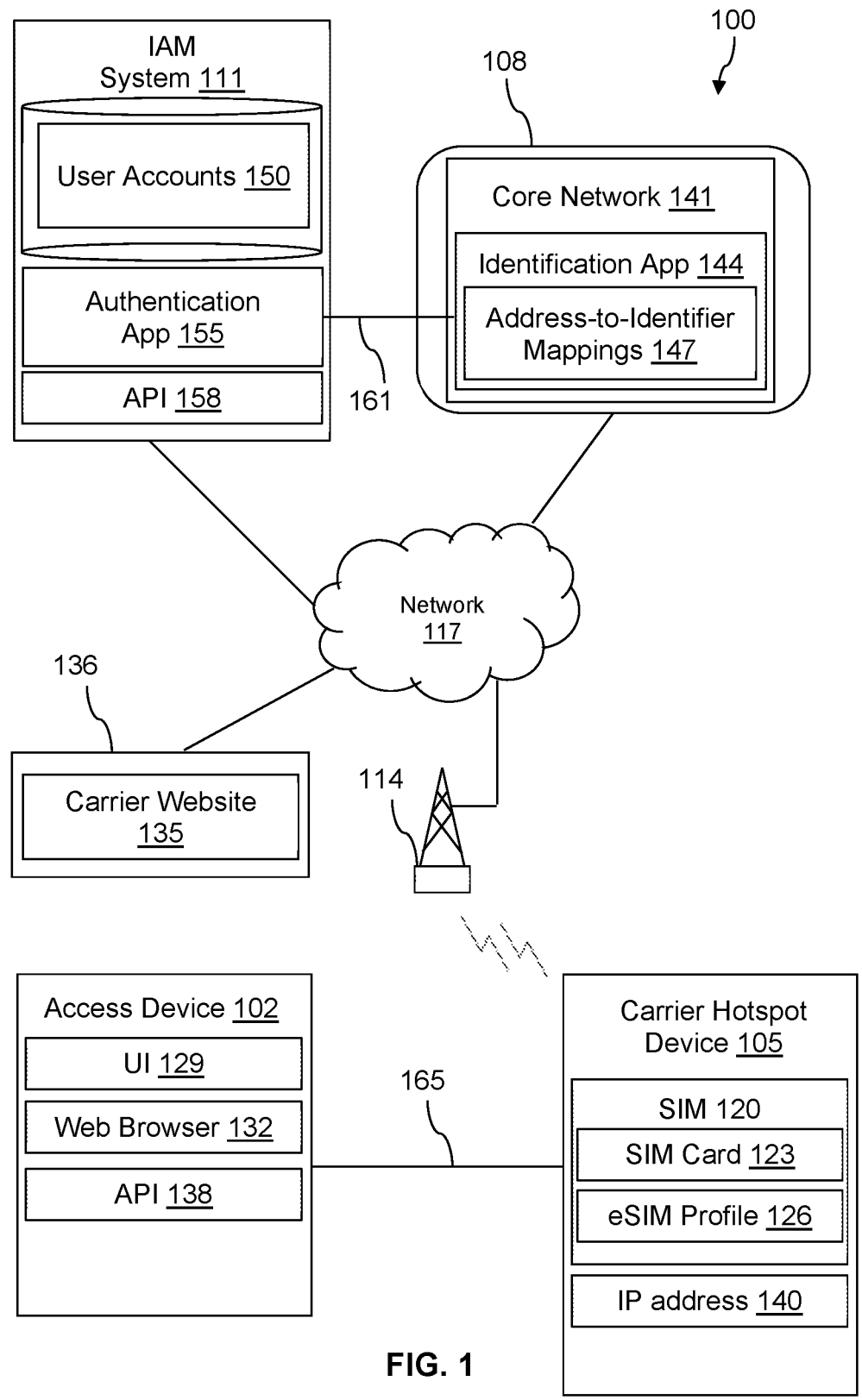
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As mentioned above, a subscriber or user of a telecommunications carrier may purchase one or more devices through the carrier and purchase one or more voice and/or data connection plans to use with the devices. The devices offered for purchase by the carrier may include various types of devices, such as, for example, mobile phones, mobile tablets, headsets, wearable devices, hotspot devices, Internet of Things (IoT) devices, in-vehicle communication devices, and/or other devices that may use a voice or data connection plan. Each of these devices may have different capabilities. For example, some mobile phones, mobile tablets, and wearable devices may be capable of receiving and sending SMS messages and multimedia messaging service (MMS) messages. Similarly, some mobile phones, mobile tablets, and wearable devices may include fingerprint sensors and facial recognition technologies. However, some of the devices, such as the hotspot devices, the IoT devices, and the in-vehicle communication devices, may have limited hardware resources for processing and communication tasks. For example, some of the hotspot and IOT devices may not be capable of receiving and sending SMS and MMS messages, and may not include fingerprint sensors and facial recognition technologies.

Regardless of the type of device purchased by a user, the user may create a user account with the carrier through an IAM system associated with the carrier. An IAM system may be a system of servers that implement a framework of policies and technologies to ensure that the right users of the carrier have the appropriate access to technology resources in the carrier network. Users may access and manage user accounts through the IAM system.

The user may create the account by accessing the carrier website or application at the purchased device or another device with Internet access. Creating a user account at the IAM system may involve a registration process in which the user provides information identifying the user and the user account, and other information used to authenticate the user. The information used to authenticate the user may include, for example, user credentials (e.g., a username and password) MSISDN, and other information that may be used to authenticate the user. The information received from the user during the registration process may be stored at the IAM system in a user account of the user.

Once the IAM system has received the credentials and the identifying information of the user, the IAM system may request proof of possession of the purchased device. The proof of possession may be provided using a one-time password (e.g., sequence of alphanumeric characters), in which the IAM system may transmit the one-time password to the purchased device via, for example, a SMS message or an MMS message. The user may enter the one-time password through the carrier website or application, and the IAM system may verify that the entered one-time password is the same as the one-time password sent to the purchased device to determine the user has possession of the device.

After an account is created, users may log in to the user account using a variety of methods. For example, a user may access a carrier website, or application, and enter the user credentials to access the user account at the IAM system. In some cases, certain applications require a password as a first factor authentication, and then require a separate, second factor authentication, which may be an SMS one-time password. In this case, the IAM system may again transmit the one-time password to the user device via an SMS message, to prove the user has possession of the device. The user may enter the one-time password through the carrier website or application, and the IAM system may verify that the entered one-time password is the same as the one-time password sent to the purchased device to determine the user has possession of the device.

After an account is created, users may forget the password associated with the user account. In this case, the IAM system may again request the one-time password to the user device via an SMS message, to prove the user has possession of the device, before providing the password or instructions to reset the password. Furthermore, a user may stay logged in on a particular application on a device using browser cookies where the application does not require significant security. In some cases, cookies may be cleared, lost or expire. In these cases, the IAM system may again request proof of possession of the device using the one-time password.

However, as mentioned above, some devices purchased through the carrier may not be capable of receiving and sending SMS and MMS messages. For this reason, when a user purchases a device that is not capable of messaging (e.g., a hotspot or IoT device), the user may not be able to provide proof of possession using the SMS one-time password method. Therefore, the user may not be able to create or access a user account through the IAM system with these types of devices because the user may not be able to provide proof of possession of the device.

The embodiments disclosed herein are directed to methods and systems for providing a technical solution to a technical problem in the field of device authentication, which may occur due to the lack of resources available in certain types of devices (e.g., hotspot devices and IoT devices). The embodiments disclosed herein are directed to automatically providing proof of possession of the device to the IAM system based on an Internet Protocol (IP) address of a hotspot device registered with the carrier and connected to the device. Instead of exchanging a message with a one-time password over SMS or MMS, the IAM system may obtain the IP address of the device and verify the IP address as being associated with a device registered with carrier, to prove that the user has possession of the device, as further described herein.

In an embodiment, a device registered with the carrier, such as a hotspot device, may not be capable of messaging, but may still include a Subscriber Identity Module (SIM) card or an electronic SIM (eSIM) profile for the data connection. The SIM card or eSIM profile may be identified by an International Mobile Subscriber Identity (IMSI). The SIM card or eSIM profile may each include the network access keys or network access credentials necessary to access the cell site and corresponding radio access network (RAN) associated with the carrier (hereinafter referred to as the "carrier network"). The device may be attached to the carrier network using the network access credentials and keys stored with the SIM card or eSIM profile.

After connecting and registering to the carrier network, the carrier may allocate an IP address to the device, which may be a unique address assigned to the device. The carrier network may use the IP address to route traffic to and from the device in a secure manner. In an embodiment, an identification application in a core network of the carrier network stores an association between the IP address allocated to the device and an identifier of the device. For example, the identification application may be a Policy and Charging Rules Function (PCRF) component, an Authentication, Authorization, and Accounting (AAA) component, or any other component in the core network that may manage the IP addresses allocated to various registered devices. The identifier of the device may be, for example, a MSISDN number uniquely identifying a subscription of the device, or an IMSI identifying the SIM card or eSIM profile. In this way, the core network may store mappings between the identifier of registered devices and the IP address allocated to the registered device by the carrier.

When the device is also enabled as a hotspot device, the device may act as a WiFi hub or WiFi hotspot for other devices within a certain range of the device. In other words, other devices may connect, or tether to, the device when the device is connected to the carrier network, such that the other devices may also access the Internet via the carrier network. The device that is registered with the carrier and enabled as a hotspot device, as described above, may hereinafter be referred to as the "hotspot device" or the "carrier hotspot device." The carrier hotspot device may be any device enabled to act as a hotspot, capable of tethering to different types of devices, such as IoT devices, but, in some cases, may not be capable of sending and receiving SMS and MMS messages.

A device with WiFi capability may tether to the carrier hotspot device, and some of these devices may not include a SIM card or eSIM profile, but may include displays, UIs, and web browsers that enable users to browse the Internet when Internet access is available. For example, one such device may be a laptop that is capable of tethering to the carrier hotspot device, but does not itself include a SIM card or eSIM profile used to establish a data connection to the carrier network. Instead, the laptop may establish a WiFi hotspot connection to the carrier hotspot device, which is connected to the carrier network, to access the carrier network and the Internet through the carrier hotspot device.

The device that may not include a SIM card, eSIM profile, or other feature used to connect directly to the carrier network, may hereinafter be referred to as the "access device." The access device may be associated with a private IP address, for example, only known locally within the local area network and the hub. However, once the access device is connected to the carrier hotspot device, the communications to and from the access device external to the local area network may be addressed using the IP address of the carrier hotspot device. In this way, the carrier network may then communicate to the access device through the carrier hotspot device using the IP address of the carrier hotspot device.

Once the access device tethers to the carrier hotspot device, the user may use the access device to create or access a user account through an authentication application in an IAM system associated with the carrier. For example, the user may first access a carrier website through a web browser on the access device when the access device is tethered to the carrier hotspot device. Alternatively, the user may access the carrier site through a carrier application installed at the access device when the access device is tethered to the carrier hotspot device. When the user creates a user account or subsequently accesses the user account, the authentication application may request credentials to authenticate the user. In this case, the user may create a profile by entering credentials and other identifying information of the user, or the user may subsequently access the user account using the previously registered credentials.

In some embodiments, for example with applications that may not require higher levels of security, the IAM system may not request the user to enter credentials such as the username or password. However, the access device may still send a request to the IAM system to access the user account. In either case, the authentication application in the IAM system receives the user credentials or a request to access the user account.

In an embodiment, the authentication application may then obtain additional information as proof of possession of a device registered with the carrier, which in this case is the carrier hotspot device (i.e., not the access device itself, since the access device is not registered with the carrier and does not have a subscription plan with the carrier). When the carrier hotspot device is not capable of exchanging messages with the IAM, in some embodiments, the authentication application may instead obtain the IP address of the carrier hotspot device based on communications with the access device. For example, the authentication application may obtain the IP address of the carrier hotspot device from a request received over the carrier network. In an embodiment, the authentication application may extract the IP address from communications with the carrier hotspot device, based on the source address included in data packets received from the access device (e.g., the open systems interconnections (OSI) IP layer source IP address).

Upon obtaining the IP address, the authentication application in the IAM system may transmit the IP address to the identification application and request the identifier associated with the IP address. The identification application may perform a lookup based on the IP address and return the identifier associated with the IP address to the authentication application in the IAM system when the IP address exists in the system. The authentication application may then determine, based on the identifier returned by the identification application, that the IP address obtained through communications with the access device is in fact registered with the carrier network. As such, the authentication application may determine that the user possesses the carrier hotspot device registered with the carrier network. This is because the access device used the carrier hotspot device to communicate to the authentication application. At this stage, the authentication application may grant the creation or access of the user account with the carrier through the IAM system.

In the case in which the identification application does not find the IP address in the system (i.e., the IP address has not been allocated to a device by the carrier), the identification application may send a message to the authentication application indicating the failure to find the IP address associated with the access device. The authentication application may then request the user attached to the carrier network to retry the attempted request, or fallback to using the SMS one-time password, or other methods of authentication, for providing proof of device possession.

In other embodiments, the carrier hotspot device may not necessarily be a pure hotspot device, but may be another type of device that is directly connected to the carrier network and registered with the carrier network. For example, the carrier hotspot device may be a mobile phone, a mobile tablet, a wearable device, vehicle system, or an IoT device. As mentioned above, some of these carrier hotspot devices may still not be capable of receiving and sending SMS messages, to exchange one-time passwords as a mechanism for proving possession of the device. In one embodiment, a user may attempt to create or access the user account using user credentials via a user interface of the carrier hotspot devices, and the carrier hotspot device may transmit the credentials to the IAM system to create or access the user account. In another embodiment, the carrier hotspot device may transmit a request, without credentials, to the IAM system. In either case, IAM system may obtain the IP address of the carrier hotspot device, included in the request, to prove possession of the device and permit the carrier hotspot device to create or access the user account.

Accordingly, the embodiments disclosed herein enable devices that are not capable of otherwise performing certain steps of authentication to still be authenticated with the carrier network seamlessly, in the background through the use of an authentication application at the IAM system. Instead of exchanging a message with a one-time password, the IAM system may obtain the IP address of the device and verify the IP address as being associated with the device, to prove whether the user has possession of the device. By eliminating the use of the one-time password, the user is no longer inconvenienced with the extra step of reading a code in text message, and manually entering the code into the website. In addition, network resources are reduced by eliminating the need to transmit the code back and forth between the device and the IAM system. Even further, the embodiments disclosed herein reduce the load on the network and may prevent the transmission of highly sensitive personal biometric information through the network.

Turning now to FIG. 1, a communication system 100 is described. The system 100 comprises an access device 102, a carrier hotspot device 105, a carrier network 108, a IAM system 111, a cell site 114, and a network 117. The carrier hotspot device 105 may be communicatively coupled to the carrier network 108, network 117, and/or the IAM system 111 via the cell site 114 after the carrier hotspot device 105 is authenticated and registered with the carrier network 108. The access device 102 may be communicatively coupled to the carrier network 108, network 117, and/or the IAM system 111 via a hotspot connection to the carrier hotspot device 105.

The carrier hotspot device 105 may be a device enabled to act as a hotspot and share a data connection with the carrier network 108 with one or more other devices, such as the access device 102. In an embodiment, the carrier hotspot device 105 may be a portable hotspot device provided by the carrier, an IoT device, or any other type of device with a data connection and hotspot capabilities. In an embodiment, the carrier hotspot device 105 may include a SIM 120 and be registered with the carrier network using the network credentials and keys stored on the SIM 120. The SIM 120 may either be a physical SIM card 123 or an eSIM profile 126. A physical SIM card 123 is an integrated circuit running a card operating system intended to securely store the IMSI number and related network credentials/keys used to identify and authenticate the user of the carrier hotspot device 105. The eSIM profile 126 may be included in an embedded universal integrated circuit card (eUICC) of the carrier hotspot device 105. The eSIM profile 106 may also be provisioned with the network access keys and/or network access credentials, branding information, applications, and other data artifacts used to identify and authenticate the user of the carrier hotspot device 105.

In an embodiment, the carrier hotspot device 105 may not be capable of sending and receiving SMS messages. The carrier hotspot device 105 may also not include any fingerprint sensing or facial recognition hardware or software. As should be appreciated, the carrier hotspot device 105 may include other components not otherwise shown in FIG. 1 or described herein.

For example, the carrier hotspot device 105 may be an IoT device (e.g., smart device, gaming console, printer, camera, lighting appliances, smart thermostat, etc.), which includes a SIM 120 registered with the carrier network 108. As such, the IoT device may be able to connect to and access the carrier network 108, and may be enabled to act as a hotspot device to share a communication link to the network 117 and the carrier network 108. However, IoT devices typically do not have voice communication capabilities or SMS messaging capabilities.

As another example, the carrier hotspot device 105 may be an in-vehicle communication device, which may be a computer installed at the dashboard of a vehicle. An in-vehicle communication device is sometimes also referred to as a "head unit" or "telematics" unit or device. For example, an in-vehicle communication device may be embedded onboard system that controls wireless tracking, diagnostics, and communication to and from the vehicle. Similar to the IoT devices mentioned above, an in-vehicle communication device may comprise a SIM 120 registered with the carrier network 108. Thus, the in-vehicle communication device may be able to connect to and access the carrier network 108, and may be enabled to act as a hotspot device to share a communication link to the network 117 and the carrier network 108. However, the in-vehicle communication device may not have voice communication capabilities or SMS messaging capabilities.

The access device 102 may be a device including a display and a web browser 132, and which is capable of a WiFi connection through, for example, the carrier hotspot device 105. However, the access device 102 may not be capable of including a SIM card or an eSIM profile, and is not capable of directly accessing the carrier network through a subscription plan with a carrier. In this way, the access device 102 may not be directly registered with a carrier. For example, the access device 102 may be a laptop, personal computer, a mobile phone that does not include a SIM card or eSIM profile, a personal digital assistant (PDA) that does not include a SIM card or eSIM profile, an Internet of things (IoT) device that does not include a SIM card or eSIM profile, a wearable computer that does not include a SIM card or eSIM profile, or a headset computer that does not include a SIM card or eSIM profile.

The access device 102 may include a UI 129, a web browser 132, and one or more application programming interfaces (APIs) 138. A carrier website 135 associated with the carrier network 108 may be hosted by a server 136 external to the access device 102 and attached to the network 117. The access device 102 may access an interface of the carrier website 135 using the web browser 132 of the access device 102. A user of the access device 102 may interact with the carrier webpage 135 using the UI 129 of the access device 102. The API 138 may be used as an interface by which to communicate with, for example, the IAM system 111. As should be appreciated, the access device 102 may include other components not otherwise shown in FIG. 1 or described herein.

The network 117 may be one or more private networks, one or more public networks, or a combination thereof. While FIG. 1 shows the carrier network 108 as being separate from the network 117, it should be appreciated that, in some embodiments, at least a portion of the carrier network 108 may be part of the network 117. The cell site 114 provides the carrier hotspot device 105 a wireless communication link to the carrier network 108, network 117, and/or the IAM system 111 according to a 5G, a long term evolution (LTE), a code division multiple access (CDMA), or a global system for mobile communications (GSM) wireless telecommunication protocol.

The carrier network 108 may be a network including a radio access network (RAN) and a core network 141. The RAN may include the access network containing the radio elements of a cell network, and the core network 141 may include the elements that manage the user information, call setup and routing, and related system supports. In an embodiment, the core network 141 may be an evolved packet core (EPC) core network. The core network 141 may be a configured to implement a 5G, a LTE, a CDMA, or a GSM wireless telecommunication protocol. In one embodiment, the core network 141 may be a 3rd Generation Partnership Project (3GPP) Evolved Packet System (EPS).

The core network 141 includes the identification application 144, among other components of the core network 141 not otherwise shown in FIG. 1 or described herein. In an embodiment, the identification application 144 may be a PCRF component, an AAA component, or any other component in the core network 141 that may manage the IP addresses allocated to various registered devices. In an embodiment, the identification application 144 maintains address-to-identifier mappings 147, which may store associations between IP addresses of devices registered with and allocated by the carrier and identifiers associated with the devices registered with the carrier. The identifiers associated with the devices may be MSISDNs, IMSIs, or any other identifier that may uniquely identify a device registered with the carrier.

The IAM system 111 may be a system of servers implementing a framework of policies and technologies to ensure that the users of the carrier have the appropriate access to technology resources in the carrier network 108. Users may access and manage user accounts 150 through the IAM system 111. A user may access the user account 150 using the carrier website 135, which communicates with the IAM system 111, to make changes to the user account 150. For example, the user may add a new line and corresponding device to a family plan, remove a line from a family plan, purchase a device, pay a bill, change a payment type or method, edit user information, etc., following authentication and authorization through the IAM system 111.

The IAM system 111 may maintain user accounts 150, which are accounts including subscription and user information of subscribers registered with the carrier of the carrier network 108. The user accounts 150 may be associated with credentials, such as a username and password, created by the user upon creating the user account 150. The subscription information may include other information regarding devices registered with the carrier (e.g., the carrier hotspot device), such as, for example, the identifier of the device, and information regarding voice and data plans subscribed to by the user. The subscription information may also include information describing the user, such as, for example, a name and address of the user.

The IAM system 111 also includes the authentication application 155. The authentication application 155 may authenticate the user creating an account or logging in to the carrier website 135 at the access device 102, as further described herein. The authentication application 155 in the IAM system 111 may be communicatively coupled to the identification application 144 at the core network 141 via a link 161, which may be a wired or wireless link. For example, the authentication application 155 and the identification application 144 may communicate with one another using one or more APIs 158. The IAM system 111 may include the APIs 158, which are interfaces used to communicate with one or more entities in the system 100, such as, for example, the access device 102 or the identification application 144.

In an embodiment, the carrier hotspot device 105 may authenticate to and attach to the cell site 114 or the RAN in the carrier network 108, which gives the carrier hotspot device 105 access into the carrier network 105. The SIM 120 in the carrier hotspot device 105 includes network access credentials and keys used to attach the carrier hotspot device 105 to the carrier network 108 through the cell site 114 or RAN. The carrier hotspot device 105 (e.g., a radio modem or transceiver in the carrier hotspot device 105) may perform a lookup on the network access credentials and present these network access credentials to the carrier network 108 (e.g., a cell tower, cell site 114, or RAN). The carrier network 108 may perform user authentication and service access authorization on the carrier hotspot device 105 based on the network access credentials received from the carrier hotspot device 105. The carrier network 108 may provide access to the carrier hotspot device 105 after authentication and authorization based on the network access credentials. The authentication performed between the carrier hotspot device 105 and the carrier network 108 is considered to be robust and highly secure.

Once the carrier hotspot device 105 is authenticated and attached to the carrier network 108, the carrier network 108 may allocate a unique IP address 140 to the carrier hotspot device 105. The carrier network 108 may transmit an indication of the IP address 140 to the carrier hotspot device 105. The carrier network 108 may use the IP address 140 to route traffic and data packets to and from the carrier hotspot device 105. For example, the IP address 140 may be indicated as the destination address in data packets destined for the carrier hotspot device 105, and the IP address 140 may be indicated as the source address in data packets received from the carrier hotspot device 105.

The access device 102 may establish a tethered connection 165 with the carrier hotspot device 105, which would provide the access device 102 a WiFi connection to the carrier network 108 and the Internet through the carrier hotspot device 105. The carrier hotspot device 105 thereby shares the communication link to the network 117 and carrier network 108 with the access device 102. Once the access device 102 has successfully established the tethered connection 165 to the carrier hotspot device 105, the carrier network 108 may route traffic to and from the access device 102, through the carrier hotspot device 105, using the IP address 140. The carrier hotspot device 105 will forward packets to the access device 102, using a private IP address of the access device 102, which is different from the IP address 140. In this way, IAM system 111 connects to the access device 102 and the carrier hotspot device 105 using the IP address 140 of the carrier hotspot device 105 when the access device 102 is connected to the carrier hotspot device 105.

Figure 2:
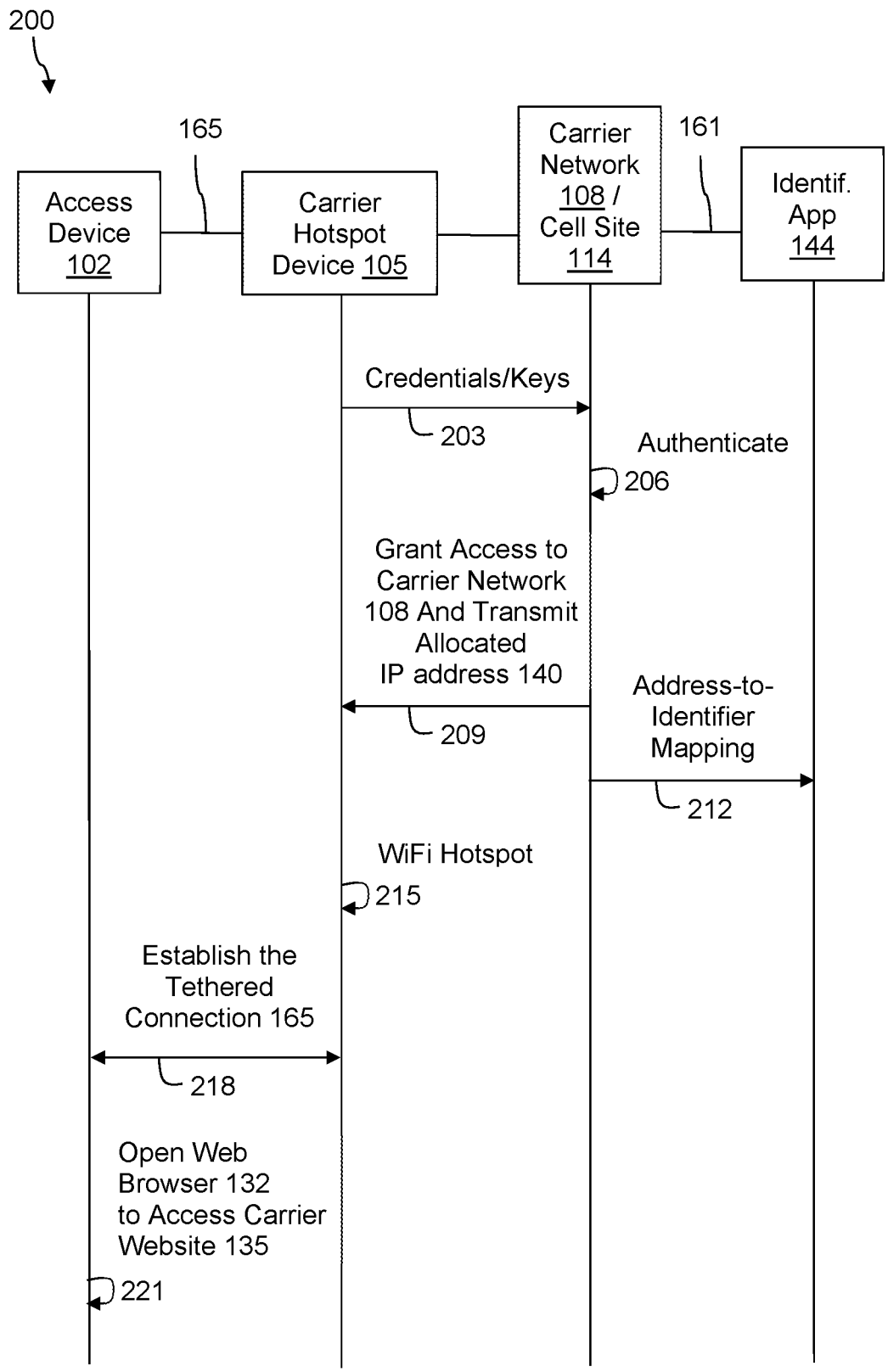
FIG. 2 is a message sequence diagram of a first method performed by the communication system of FIG. 1 according to an embodiment of the disclosure.

Turning now to FIG. 2, shown is a message sequence diagram illustrating method 200. Method 200 is performed by the access device 102, the carrier hotspot device 105, the carrier network 108 or cell site 114, and the identification application 144 in the core network 141. Method 200 may be performed before the carrier hotspot device 105 is authenticated and attached to the carrier network 108.

At step 203, the carrier hotspot device 105 transmits network credentials and/or network keys, stored at the SIM 120 associated with the carrier network 108, to the cell site 114 (or other cell tower in the carrier network 108). At step 206, the cell site may perform user authentication and service access authorization on the carrier hotspot device 105 based on the network access credentials received from the carrier hotspot device 105.

Once the carrier hotspot device 105 is authenticated, at step 209, the cell site 114 may grant the carrier hotspot device 105 access to the carrier network 108. At step 209, the carrier network 108 may also allocate, or assign, an IP address 140 to the carrier hotspot device 105. The cell site 114 may transmit the allocated IP address 140 to the carrier hotspot device 105.

At step 212, the carrier network 108 may transmit an address-to-identifier mapping 147 of the carrier hotspot device 105 to the identification application 144 via the link 161. The address-to-identifier mapping 147 associates the identifier of the carrier hotspot device 105 with the allocated IP address 140. The identification application 144 may store the address-to-identifier mapping 147 in a data store accessible to the identification application 144 in the core network 141.

At step 215, after the carrier hotspot device 105 has been authorized to connect to the carrier network 108, the carrier hotspot device 105 may also be enabled to act as a WiFi hotspot. By acting as a WiFi hotspot, other devices may access the carrier network 108, and the Internet, by connecting or tethering to the carrier hotspot device 105.

At step 218, the access device 102 may communicate with the carrier hotspot device 105 to establish the tethered connection 165. For example, the access device 102 may identify the carrier hotspot device 105 as a WiFi hub or WiFi network. The access device 102 may then provide the password associated with the connection to the carrier hotspot device 105 to establish the tethered connection 165 with the carrier hotspot device 105. The carrier hotspot device 105 and the access device 102 may exchange further messages to set up the tethered connection 165 as a secure wireless connection.

At this stage, the access device 102 is communicatively coupled to the carrier network 108 via the carrier hotspot device 105. At step 221, the user may open the web browser 132 to access the carrier website 135 associated with the carrier network 108. The carrier website 135 is the website through which the user may access the user account 150 associated with the carrier, and make changes to user account 150 as desired.

Figure 3:
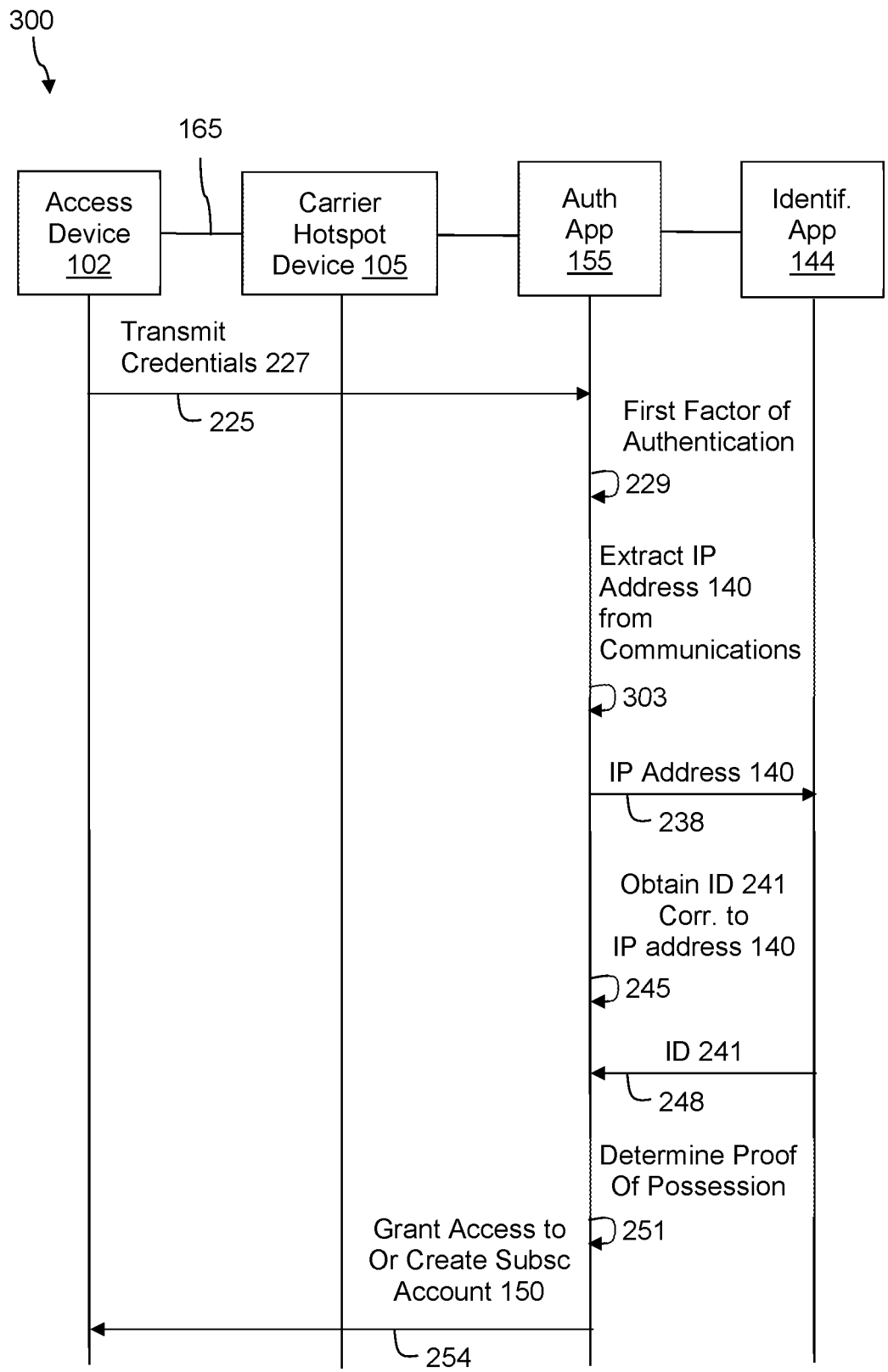
FIG. 3 is a message sequence diagram of a second method performed by the communication system of FIG. 1 according to an embodiment of the disclosure.

Turning now to FIG. 3, shown is a message sequence diagram illustrating method 300. Method 300 is performed by the authentication application 155 in the IAM system 111, the access device 102, the carrier hotspot device 105, and the identification application 144.

At step 225, the user accessing the carrier website 135, or carrier application, may attempt to create a user account 150 or access the user account 150 through the carrier website 135. In doing so, the user may enter credentials 227 (e.g., a username and password) into the carrier website 135 via the UI 129. The access device 102 may transmit the credentials 227 to the authentication application 155 in the IAM system 111.

When the user is creating a user account 150, the authentication application 155 may store the entered credentials 227 in association with the user account 150 at the IAM system 111 with the other identifying information of the user. Once the credentials 227 and identifying information of the user have been stored at the IAM system 111, the user creating the user account 150 via the access device 102 may pass the first factor of authentication, at step 229.

When the user is accessing an already created user account 150 via the access device 102, the authentication application 155 may verify whether the entered credentials 227 match the credentials stored in the IAM system 111. If the credentials 227 match the credentials stored in the IAM system 111, the user accessing the user account 150 via the access device 102 may pass the first factor of authentication, at step 229.

After the first factor of authentication has passed at step 229, the authentication application 155 may perform steps for the second factor of authentication, which may include the authentication application 155 obtaining the IP address 140. In some embodiments, the application may have a lower level of security, and the IAM system may not request the user credentials from the user for logging in to the user account 150. In this case, the method 300 may proceed directly to step 303, without the need to perform the first factor of authentication. In other embodiments, the application may have higher level of security, and the IAM system may request other authentication information (e.g., security questions, questionnaire, etc.) from the access device 102 prior to proceeding to step 303.

At step 303, the authentication application 155 may extract the IP address 140, for example, from a source address or source identifier field in a data packet received from the access device 102. For example, the authentication application 155 may receive data packets, or IP packets, from the access device 102 when the access device transmits the credentials 227 at step 225, or when the access device 102 transmits a data packet with a request to the IAM system 111 to create or access the user account 150. The authentication application 155 may parse one or more of these data packets and obtain the IP address 140 of the source of the data packets, which may be the IP address of the carrier hotspot device 105. The access device 102 may transmit other data packets as well, each of which may indicate the IP address 140 of the carrier hotspot device 105 in the source address or source identifier field of the data packet. The authentication application 155 may obtain the IP address 140 from the source address or source identifier field in any data packet received from the access device 102.

Once the authentication application 155 obtains the IP address 140, step 238 may be performed, in which the authentication application 155 may transmit the IP address 140 to the identification application 144, requesting the identification application 144 to provide the identifier 241 of a device associated with the IP address 140. At step 245, the identification application 144 may perform a look-up at the address-to-identifier mappings 147 to obtain the identifier 241 corresponding to the IP address 140. When the identification application 144 obtains the identifier 241 corresponding to the IP address 140, the identification application 144 transmits the identifier 241 back to the authentication application 155, at step 248.

In an embodiment, at step 251, upon receiving the identifier 241 corresponding to the IP address 140, the authentication application 155 may determine that the IP address 140 of the access device 102 is registered with the carrier network 108. The authentication application 155 may also determine that, though the access device 102 itself may not be registered with the carrier network 108, the access device 102 is communicating through the carrier hotspot device 105, which is registered with the carrier network 108. This is evidenced by the identification application 144 maintaining the IP address 140 allocated to the carrier hotspot device 105. Since the carrier hotspot device 105 may be located within a predefined region of the access device 102 for the access device 102 to use the carrier hotspot device 105 as a WiFi hotspot, the authentication application 155 may determine that the user is in proof of possession of the carrier hotspot device 105 registered with the carrier network 108. In an embodiment, the authentication application 155 may use the identifier 140 to identify that the user attempting to access the user account 150 at the access device 102 is the same user associated with the identifier 140 (e.g., user name, or other user identity). At step 254, the authentication application 155 may permit the user to create the user account 150 or grant the user access the user account 150 at the access device 102.

In this way, the two-factor authentication process disclosed herein may only request the user to manually enter the credentials 227 for the user account 150, when necessary. The second factor of authentication, which may consist of steps 232, 235, 238, 245, 248, 251, and 254 in method 300, may be performed in the background without the user having to manually enter any information or provide any biometric data.

In an embodiment, the identification application 144 may not find the IP address 140 in the address-to-identifier mappings 147 (i.e., the IP address 140 has not been allocated to a device by the carrier). In this case, the identification application 144 may send a message to the authentication application 155 indicating the failure to find the IP address 140 associated with the access device 102. At step 251, the authentication application 155 may determine that the access device does not have proof of possession of a device registered with the carrier network 108. At step 254, the authentication application may then reject the user attempt to create or access a user account 150 at the access device 102, since the access device 102 is not associated with an IP address recognized by the identification application 144 (or registered with the carrier network 108).

Figure 4:
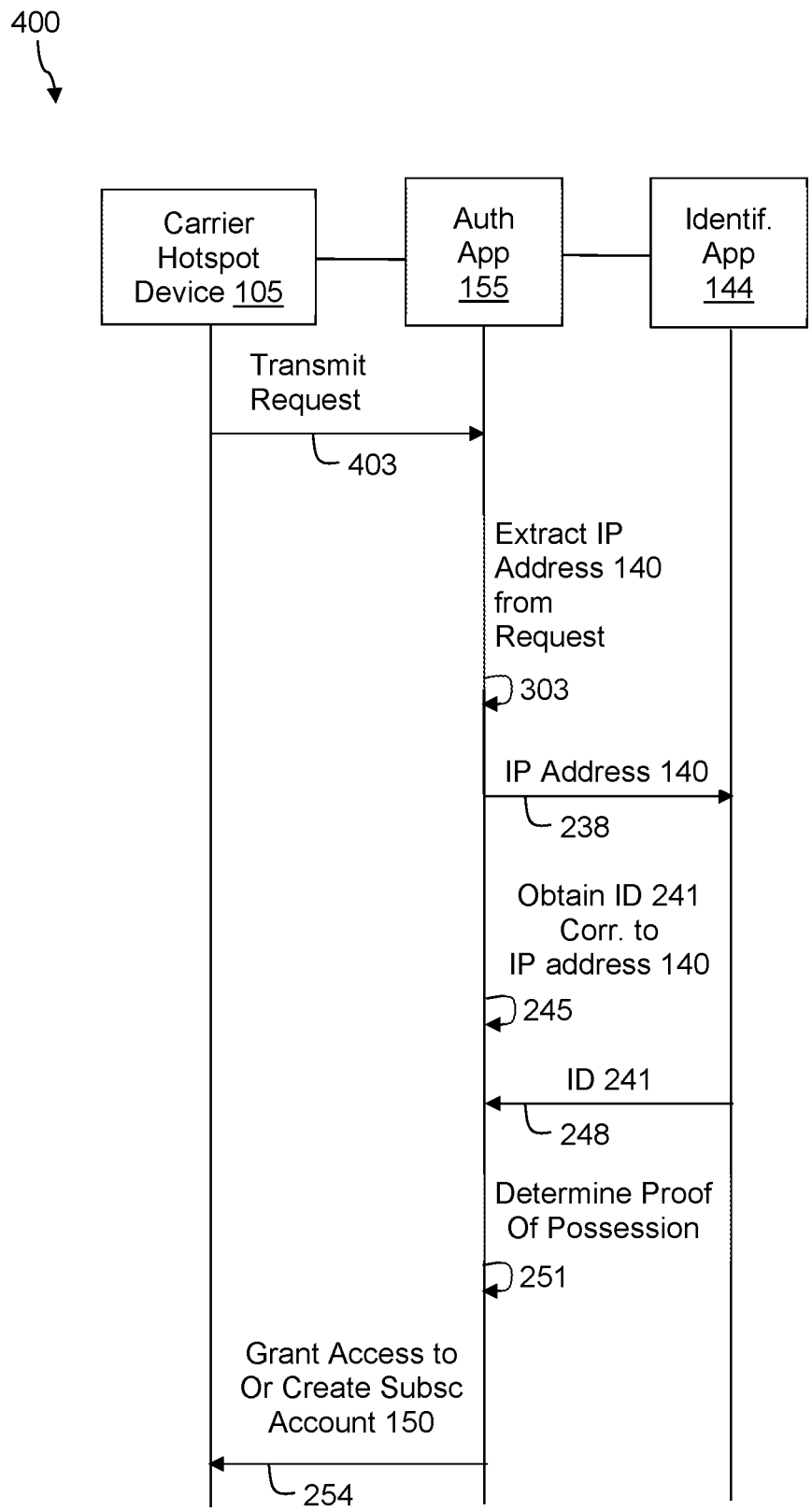
FIG. 4 is a message sequence diagram of a third method performed by the communication system of FIG. 1 according to an embodiment of the disclosure.

Turning now to FIG. 4, shown is a message sequence diagram illustrating method 400. Method 400 is performed by the authentication application 155 in the IAM system 111, the carrier hotspot device 105, and the identification application 144. Method 400 is similar to method 300, except that the carrier hotspot device 105 is attempting to access the user account 150, instead of the access device 102. In the example shown in method 400, the carrier hotspot device 105 may be a wearable device, an IoT device, an in-vehicle communication device, or another type of device that may access the carrier network 108. However, the carrier hotspot device 105 may not be capable of sending and receiving SMS or MMS messages, for providing proof of possession of the carrier hotspot device 105 using the one-time password.

At step 403, the carrier hotspot device 105 may transmit, to the IAM system 111, a request to access a user account 150 of a user registered with the carrier hotspot device 105. For example, the carrier hotspot device 105 may access the carrier website 135 or application. In one embodiment, the user may enter credentials into the carrier website 135, which may be forwarded in the request transmitted at step 403, to satisfy the first factor of authentication. In another embodiment, the carrier hotspot device 105 may simply transmit a general request to access the user account 150, without any user credentials, to the IAM system 111.

The authentication application may then perform step 303 of method 300 to extract the IP address 140 of the carrier hotspot device 105 from the request. Method 400 may then proceed to perform steps 238, 245, 248, 251, and 254, as described above with reference to method 400, to authenticate the carrier hotspot device 105 and grant access to the user account 150.

Figure 5:
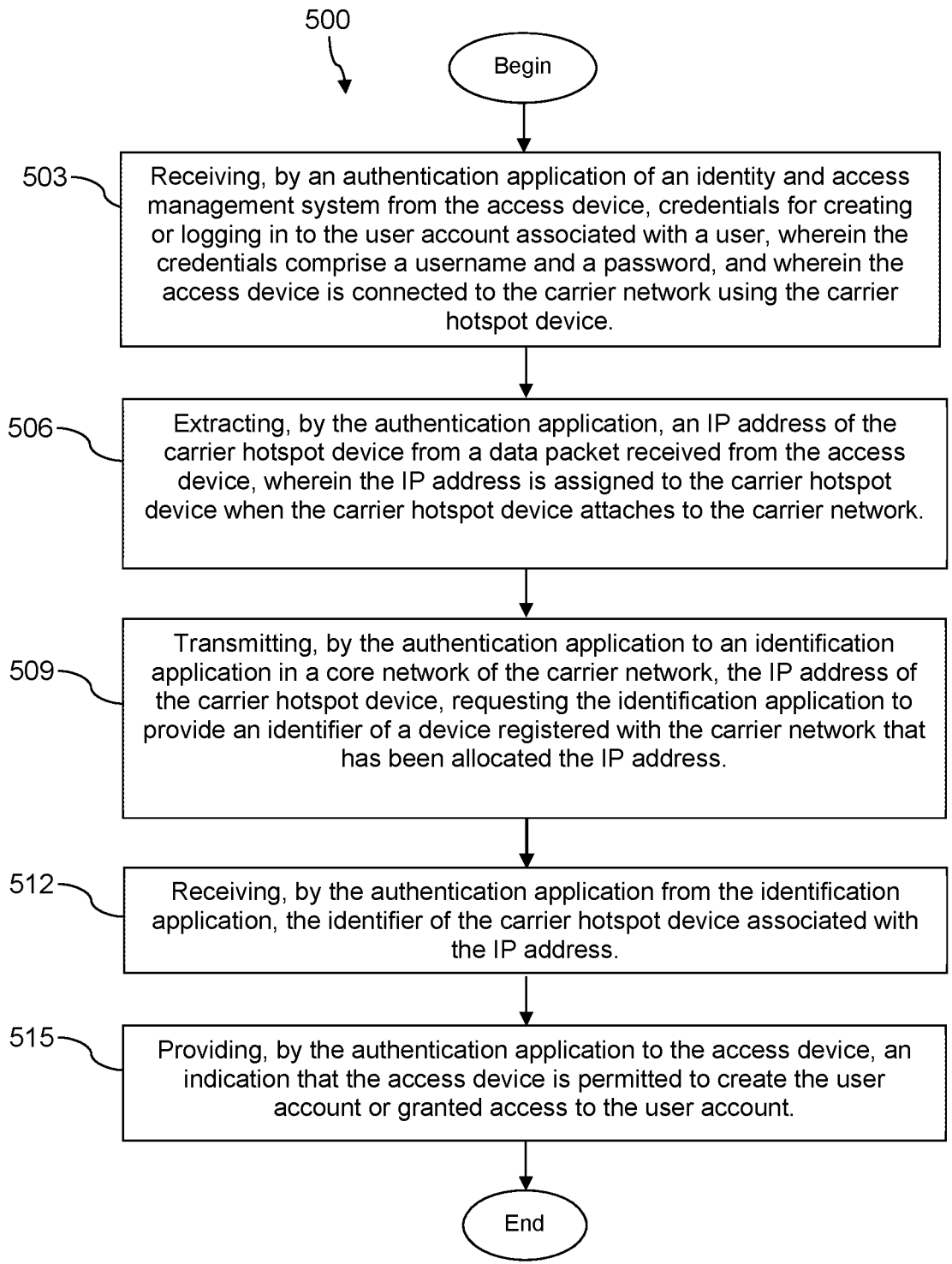
FIG. 5 is a flow chart of a second method performed by an IAM system in the communications system of FIG. 1 according to an embodiment of the disclosure.

Turning now to FIG. 5, a method 500 is described. Method 500 is a second example method for authorizing access to a user account 150 by an access device 102 connected to a carrier hotspot device 105 attached to a carrier network 108. Method 500 may be performed by the authentication application 155 after the carrier hotspot device 105 has authenticated and attached to the carrier network 108.

At block 503, method 500 comprises receiving, by an authentication application 155 of an IAM system 111 from the access device 102, credentials 227 for creating or logging in to the user account 150 associated with a user. In an embodiment, the credentials comprise a username and a password. In an embodiment, the access device 102 is connected to the carrier network 108 using the carrier hotspot device 105.

At block 506, method 500 comprises extracting, by the authentication application 155, an IP address 140 of the carrier hotspot device 105 from a data packet received from the access device 102. In an embodiment, the IP address 140 is assigned to the carrier hotspot device 105 when the carrier hotspot device 105 attaches to the carrier network 108.

At block 509, method 500 comprises transmitting, by the authentication application 155 to an identification application 144 in a core network 141 of the carrier network 108, the IP address 140 of the carrier hotspot device 105. In an embodiment, authentication application 155 requests the identification application 144 to provide an identifier 241 of a device registered with the carrier network 108 that has been allocated the IP address 140.

At block 512, method 500 comprises receiving, by the authentication application 155 from the identification application 144, the identifier 241 of the carrier hotspot device 105 associated with the IP address 140. At block 515, method 500 comprises providing, by the authentication application 155 to the access device 102, an indication that the access device 102 is permitted to create the user account 150 or granted access to the user account 150 at the access device 102.

Figure 6A:
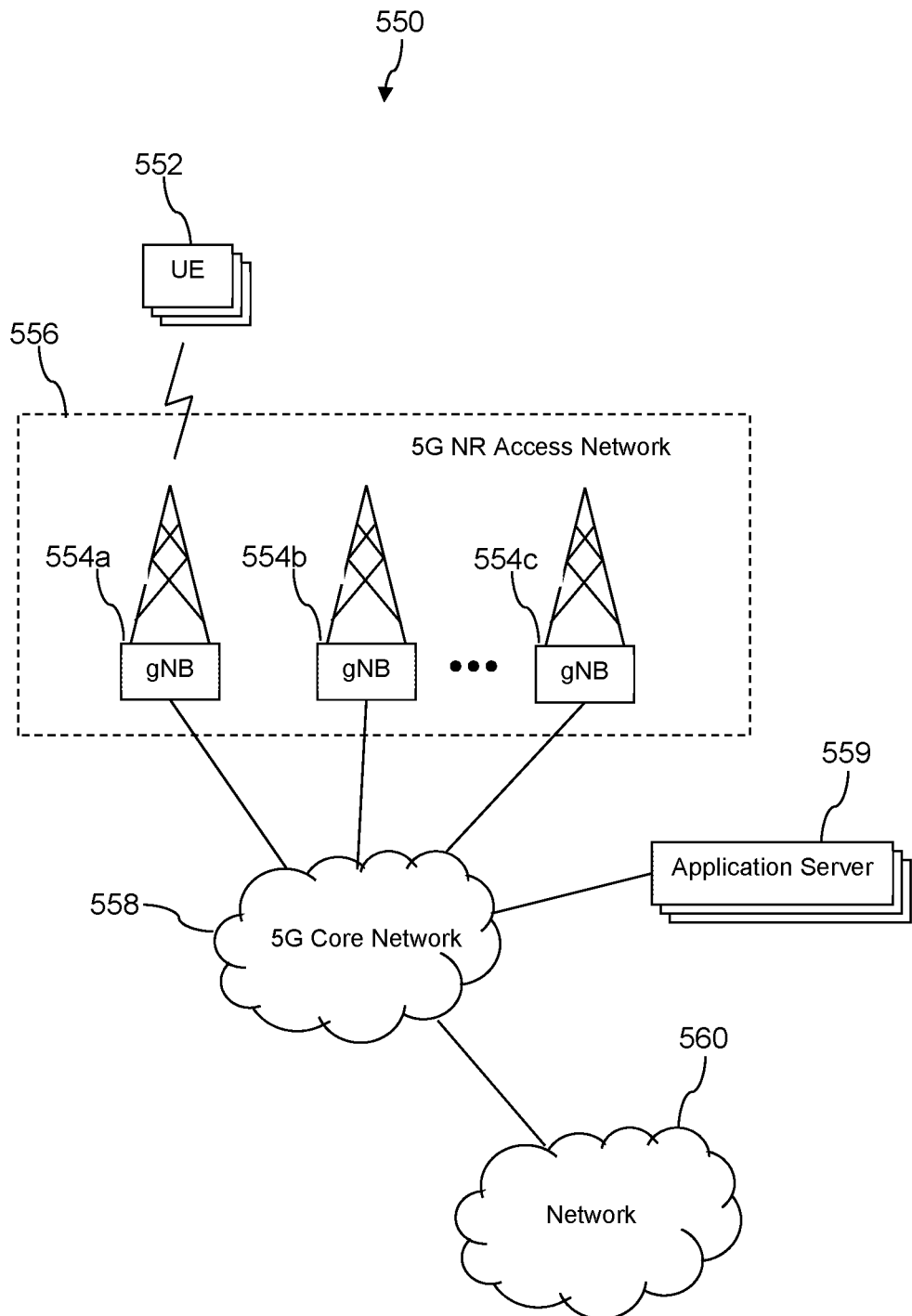
FIGS. 6A-B are block diagrams illustrating a communication system similar to the communication system of FIG. 1 according to an embodiment of the disclosure.

Turning now to FIG. 6A, an exemplary communication system 550 is described. In an embodiment, the communication system 550 may be implemented in the system 100 of FIG. 1. The communication system 550 includes a number of access nodes 554 that are configured to provide coverage in which UEs 552, such as cell phones, tablet computers, machine-type-communication devices, tracking devices, embedded wireless modules, and/or other wirelessly equipped communication devices (whether or not user operated), or devices such as the carrier hotspot device 105, can operate. The access nodes 554 may be said to establish an access network 556. The access network 556 may be referred to as RAN in some contexts. In a 5G technology generation an access node 554 may be referred to as a gigabit Node B (gNB). In 4G technology (e.g., LTE technology) an access node 554 may be referred to as an eNB. In 3G technology (e.g., CDMA and GSM) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 6B:
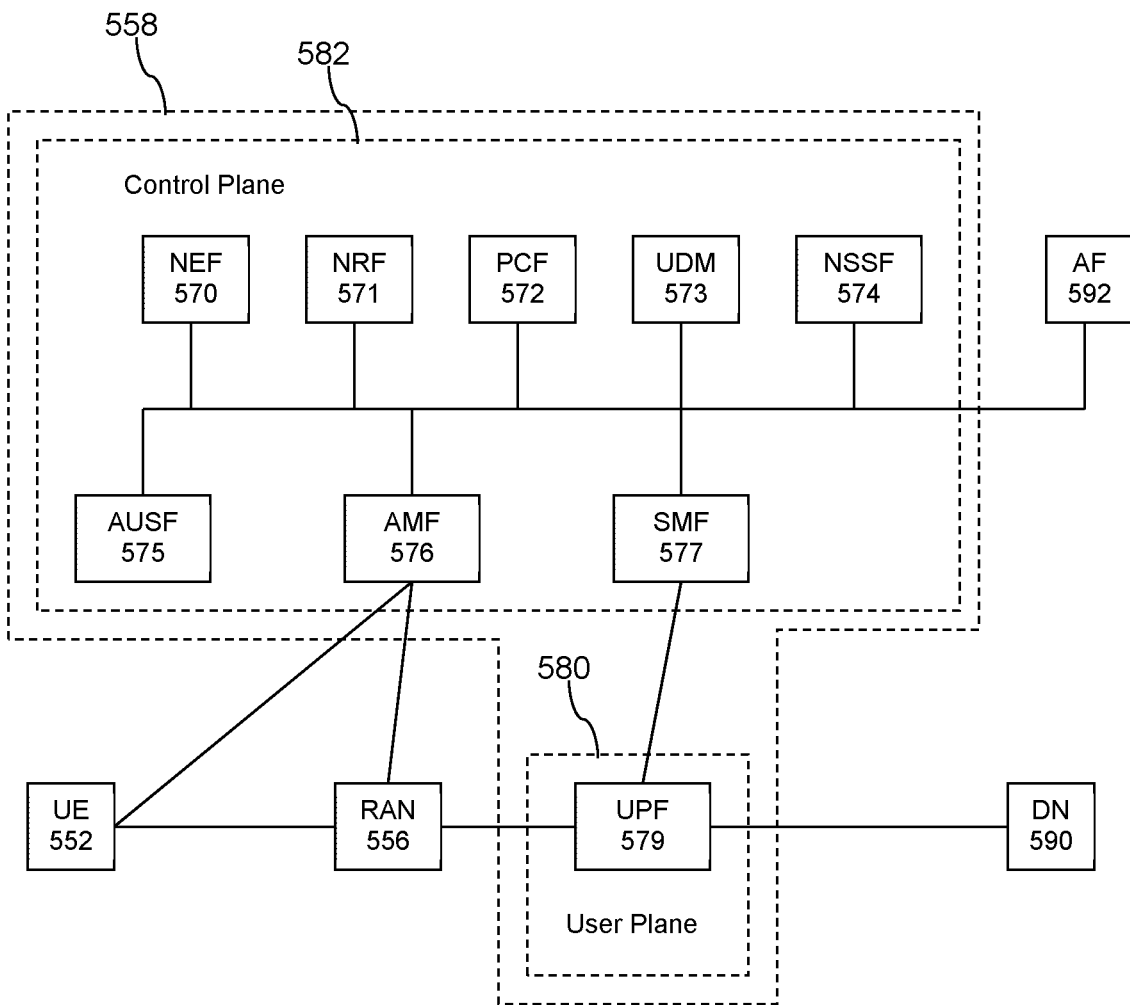

Turning now to FIG. 6B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 6A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 7:
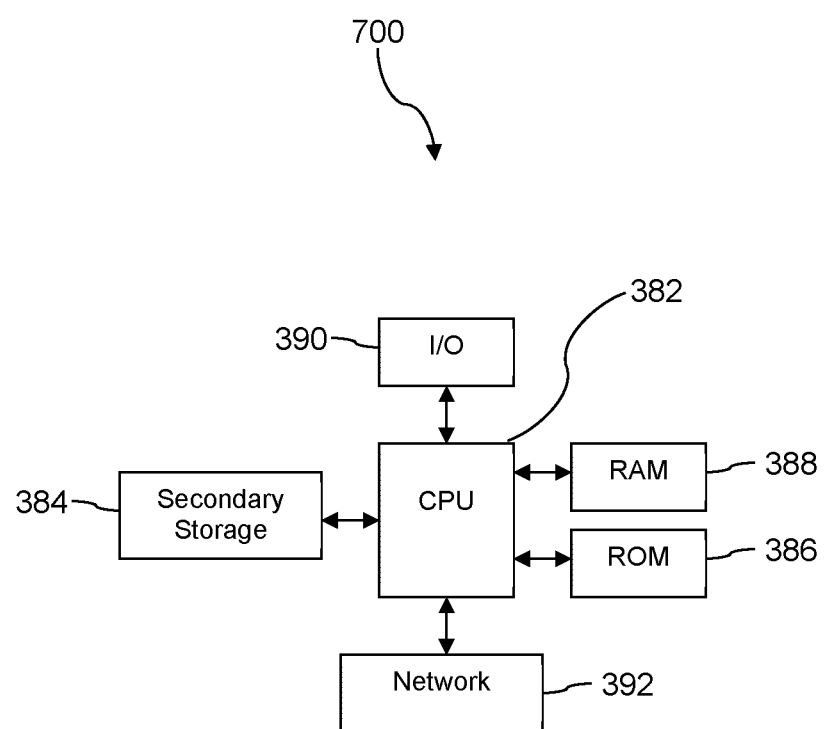
FIG. 7 is a block diagram of a computer system implemented within the communication system of FIG. 1 according to an embodiment of the disclosure.

FIG. 7 illustrates a computer system 700 suitable for implementing one or more embodiments disclosed herein. In an embodiment, the access device 102, carrier hotspot device 105, IAM system 111, and/or identification application 144 may be implemented as the computer system 700. The computer system 700 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 700, at least one of the CPU 382, the RAM 388, and the ROM 386 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 700 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 384, to the ROM 386, to the RAM 388, and/or to other non-volatile memory and volatile memory of the computer system 700. The processor 382 may process the executable instructions and/or data structures in part by directly accessing the computer program product, for example by reading from a CD-ROM disk inserted into a disk drive peripheral of the computer system 700. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 700.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 700 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for authorizing access to a user account by an access device communicatively coupled to a carrier hotspot device attached to a carrier network, wherein the method comprises:
    receiving, by an authentication application of an identity and access management system from the access device, credentials for creating or logging in to the user account associated with a user, wherein the access device is connected to the carrier network using the carrier hotspot device;
    extracting, by the authentication application, an Internet Protocol address of the carrier hotspot device from a data packet received from the access device, wherein the Internet Protocol address is assigned to the carrier hotspot device when the carrier hotspot device attaches to the carrier network;
    transmitting, by the authentication application to an identification application in a core network of the carrier network, the Internet Protocol address of the carrier hotspot device, requesting the identification application to provide an identifier of a device registered with the carrier network that has been allocated the Internet Protocol address;
    receiving, by the authentication application from the identification application, the identifier of the carrier hotspot device associated with the Internet Protocol address; and
    providing, by the authentication application to the access device, an indication that the access device is permitted to create the user account or granted access to the user account.

2. The method of claim 1, wherein the Internet Protocol address of the carrier hotspot device is extracted from a source address or source identifier field of the data packet received from the access device.

3. The method of claim 1, wherein the credentials are received in the data packet.

4. The method of claim 1, wherein the identifier of the carrier hotspot device is either a Mobile Subscriber Integrated Services Digital Network (MSISDN) number uniquely identifying a subscription of the device, or an International Mobile Subscriber Identity (IMSI).

5. The method of claim 1, wherein the carrier hotspot device comprises a Subscriber Identity Module (SIM) card or an electronic SIM (eSIM) profile.

6. The method of claim 1, wherein the carrier hotspot device is a dedicated hotspot device that is not capable of transmitting or receiving short messaging service (SMS) messages.

7. A method for authorizing access to a user account by a carrier hotspot device attached to a carrier network, wherein the method comprises:
   receiving, by an authentication application of an identity and access management system, from a carrier hotspot device connected to the carrier network, a request to create or log in to the user account, wherein the request includes an Internet Protocol address of the carrier hotspot device, wherein the Internet Protocol address is assigned to the carrier hotspot device when the carrier hotspot device attaches to the carrier network;
   extracting, by the authentication application, the Internet Protocol address of the carrier hotspot device from the request;
   transmitting, by the authentication application to an identification application in a core network of the carrier network, the Internet Protocol address of the carrier hotspot device, requesting the identification application to provide an identifier of a device registered with the carrier network that has been allocated the Internet Protocol address;
   receiving, by the authentication application from the identification application, the identifier of the carrier hotspot device associated with the Internet Protocol address; and
   providing, by the authentication application to the carrier hotspot device, an indication that the carrier hotspot is permitted to create the user account or granted access to the user account.

8. The method of claim 7, wherein the identifier of the carrier hotspot device is either a Mobile Subscriber Integrated Services Digital Network (MSISDN) number uniquely identifying a subscription of the device, or an International Mobile Subscriber Identity (IMSI).

9. The method of claim 7, wherein the carrier hotspot device comprises a Subscriber Identity Module (SIM) card or an electronic SIM (eSIM) profile.

10. The method of claim 7, wherein the carrier hotspot device is not capable of transmitting or receiving short messaging service (SMS) messages.

11. The method of claim 7, wherein the identification application maintains address-to-identifier mappings storing associations between Internet Protocol addresses of devices registered with the carrier network and identifiers associated with the devices registered with the carrier network.

12. The method of claim 7, further comprising storing the credentials at the identity and access management system after the access device is permitted to create the user account.

13. A system comprising:
   at least one processor;
   at least one non-transitory memory;
   an authentication application, stored in the at least one non-transitory memory, which when executed by the at least one processor, causes the at least one processor to be configured to:
      obtain an Internet Protocol address of a carrier hotspot device, wherein an access device is connected to a carrier network using the carrier hotspot device, wherein the Internet Protocol address is assigned to the carrier hotspot device when the carrier hotspot device attaches to the carrier network;
   an identification application in a core network of the carrier network, stored in the at least one non-transitory memory, which when executed by the at least one processor, causes the at least one processor to be configured to:
      receive, from the authentication application, the Internet Protocol address of the carrier hotspot device;
      determine an identifier of the carrier hotspot device associated with Internet Protocol address based on address-to-identifier mappings accessible to the identification application; and
      transmit the identifier to the authentication application, and
   wherein the authentication application further causes the at least one processor to be configured to provide, to the access device, an indication that the access device is permitted to create a user account or granted access to the user account.

14. The system of claim 13, wherein the authentication application further causes the at least one processor to be configured to receive, from the access device, credentials for creating or logging in to the user account associated with the user, prior to obtaining the IP address of the carrier hotspot device.

15. The system of claim 13, wherein to obtain the Internet Protocol address of the access device and the carrier hotspot device, the authentication application further causes the at least one processor to be configured to extract an Internet Protocol address of the carrier hotspot device from a data packet received from the access device.

16. The system of claim 13, wherein the identifier of the carrier hotspot device is either a Mobile Subscriber Integrated Services Digital Network (MSISDN) number uniquely identifying a subscription of the device, or an International Mobile Subscriber Identity (IMSI).

17. The system of claim 13, wherein the carrier hotspot device comprises a Subscriber Identity Module (SIM) card or an electronic SIM (eSIM) profile.

18. The system of claim 13, wherein the access device is not capable of transmitting or receiving short messaging service (SMS) messages, and wherein the access device is not capable of sensing or transmitting biometric data.

19. The system of claim 13, wherein the identification application further causes the at least one processor to be configured to maintain address-to-identifier mappings storing associations between Internet Protocol addresses of devices registered with the carrier network and identifiers associated with the devices registered with the carrier network.

20. The system of claim 13, wherein the authentication application further causes the at least one processor to be configured to store credentials related to the user account at the identity and access management system after the access device is permitted to create the user account.

* * * * *